US008496984B2

(12) United States Patent
Tranquil et al.

(10) Patent No.: US 8,496,984 B2
(45) Date of Patent: Jul. 30, 2013

(54) COMPOSITIONS AND METHODS FOR DECONTAMINATION OF ANIMAL FEED CONTAINING MYCOTOXINS TYPICAL FOR BOTH NORTHERN AND SOUTHERN CLIMATES

(75) Inventors: Elizabeth Tranquil, Jupiter, FL (US); Zosya Albertovna Kanarskaya, Kazan (RU); Dmitry Fedorovich Tikhomirov, Moscow (RU); Albert Vladimirovich Kanarsky, Voljzsk (RU)

(73) Assignee: Cubena, Inc., Jupiter, FL (US)

( * ) Notice: Subject to any disclaimer, the term of this patent is extended or adjusted under 35 U.S.C. 154(b) by 411 days.

(21) Appl. No.: 12/648,139

(22) Filed: Dec. 28, 2009

(65) Prior Publication Data
US 2010/0189856 A1 Jul. 29, 2010

Related U.S. Application Data

(60) Provisional application No. 61/141,233, filed on Dec. 29, 2008.

(51) Int. Cl.
*A23B 7/154* (2006.01)
*B01J 20/00* (2006.01)

(52) U.S. Cl.
USPC .......................................... 426/321; 502/404

(58) Field of Classification Search
USPC ...................................... 426/2, 321; 502/404
See application file for complete search history.

(56) References Cited

U.S. PATENT DOCUMENTS

| 4,764,596 | A | 8/1988 | Lora et al. |
| 5,165,946 | A | 11/1992 | Taylor et al. |
| 5,639,492 | A | 6/1997 | Turk et al. |
| 5,935,623 | A | 8/1999 | Alonso-Debolt |
| 6,045,834 | A | 4/2000 | Howes et al. |
| 6,827,959 | B1 | 12/2004 | Schall et al. |

FOREIGN PATENT DOCUMENTS

| WO | WO/95/04467 B2 | 2/1995 |
| WO | WO9701629 A1 | 6/1997 |
| WO | WO/02/052950 B2 | 7/2002 |
| WO | WO 2008053232 A2 * | 5/2008 |

OTHER PUBLICATIONS

N. Magan, D. Aldred. Post-harvest control strategies: Minimizing mycotoxins in the food chain. International Journal of Food Microbiology, 2007, 119 (1-2), pp. 131-139.
E.M. Binder, L.M. Tan, L.J. Chin, J. Handl, J. Richard. Worldwide occurrence of mycotoxins in commodities, feeds and feed ingredients. Animal Feed Science and Technology, 2007, 137 (3-4), pp. 265-282.
G. Devegowda, M.V.L.N. Raju, N. Afzali, H.V.L.N. Swami. Mycotoxin picture worldwide: novel solutions for their counteraction. In: Biotechnology in the Feed Industry, Proceedings of the 14th Annual Symposium (T.P. Lyons and K. A. Jacques eds.), 1998, Nottingham University Press, pp. 241-255.
P. Zöllner, B. Mayer-Helm. Trace mycotoxin analysis in complex biological and food matrices by liquid chromatography—atmospheric pressure ionisation mass spectrometry. Journal of Chromatography, 2006, 1136 (2), pp. 123-169.
M.C. Jewett, G. Hofmann, J. Nielsen. Fungal metabolite analysis in genomics and phenomics. Current Opinion in Biotechnology, 17 (2), pp. 191-197, 2006.
A. Huwig, S. Freimund, O. Käppeli, H. Dutler. Mycotoxin detoxication of animal feed by different adsorbents. Toxicology Letters, 2001, 122 (2), pp. 179-188.
G Devegowda, M.V.L.N. Raju, H.V.L.N. Swami. Mycotoxins: novel solutions for their counteraction. Feedstuffs, 1998, 70 (50), pp. 12-17.
M. Sabater-Vilar, H. Malekinejad, M. Selman, M. Doelen, J. Fink-Gremmels. In vitro assessment of adsorbents aiming to prevent deoxynivalenol and zearalenone mycotoxicoses. Mycopathologia, 2007, 163 (2), pp. 81-90.
G.M. Avantaggiato, M. Solfrizzo, A. Visconti. Recent advances on the use of adsorbent materials for detoxification of *Fusarium* mycotoxins. Food Additives and Contaminants, 2005, 22, pp. 379-388.
L.W. Whitlow. Evaluation of mycotoxin binders. In: Zimmerman, N.G. (ed.) Proc. 4th Mid-Atlantic Nutrition Conference, 2006, University of Maryland, College Park, pp. 132-143.
M.B.Genter, W.M. Hagler, J.A. Hansen, B.A. Mowrey, F.T. Jones, M.H. Poore, and L.W. Whitlow. Effects of mycotoxins on the health and productivity of dairy cattle. North Carolina State University. http://www.ces.ncsu.edu/gaston/Agriculture/mycotoxins/mycodairy.html.
Y. Mussaddeq, I. Begum, S. Akhter. Activity of Aflatoxins Adsorbents in Poultry Feed. Pakistan Journal of Biological Sciences, 2000, 3 (10), pp. 1697-1699.
A.D. Garcia. Mycotoxins in corn distillers grains: a concern in ruminants. Published: Brookings, S.D., South Dakota State University, Cooperative Extension Service, 2008. http://agbiopubs.sdstate.edu.proxy2.lib.uwo.ca:2048/articles/ExEx4038.pdf.
A.V. Gusakov, A.P. Sinitsyn, A.G. Berlin, N.N. Popova, A.V. Markov, O.N. Okunev, D.F. Tikhomirov, and M.A. Emalfarb. Interaction between Indigo and Adsorbed Protein as a Major Factor Causing Backstaining During Cellulase Treatment of Cotton Fabrics. Applied Biochemistry and Biotechnology, 1998, 75, pp. 279-293.
S.J. Bursian, R.J. Aulerich, J.K. Cameron, N.K. Ames, B.A. Steficek. Efficacy of hydrated sodium calcium aluminosilicate in reducing the toxicity of dietary zearalenone to mink. J. Appl. Toxicol., 1992, 12, pp. 85-90.

(Continued)

*Primary Examiner* — Humera Sheikh
*Assistant Examiner* — Bhaskar Mukhopadhyay

(57) ABSTRACT

Mycotoxins prevailing in Northern climates have been until now proven difficult to deactivate in animal feed by binding, in contrast to mycotoxins prevailing in the Southern climates. Meanwhile, both types of toxins present a considerable risk factor for agricultural animal health and performance. A method of adsorbing and rendering harmless for animals an expanded range of both Northern and Southern mycotoxins found in contaminated feed is proposed. According to the invention, a combination of modified plant ligno-polysaccharide material and traditional mycotoxin binding components is added to the feed of agricultural and companion animals in an amount sufficient to abate the negative effects of both types of mycotoxins present.

5 Claims, No Drawings

OTHER PUBLICATIONS

W.E. Huff, L.F. Kubena, R.B. Harvey, T.D. Phillips. Efficacy of hydrated sodium calcium aluminosilicate to reduce the individual and combined toxicity of aflatoxin and ochratoxin A. Poult. Sci., 1992, 71, pp. 64-69.

J. Bauer. Mouglichkeiten zur Entgiftung mykotoxinhaltiger Futtermittel. Monatsh. Veterinaurmed., 1994, 49, pp. 175-181.

A.R.Garcia, E. Avila, R. Rosiles, V.M. Petrone. Evaluation of two mycotoxin binders to reduce toxicity of broiler diets containing Ochratoxin A and T-2 toxin contaminated grain. Avian Deseases, 2003, pp. 691-699.

L.F. Kubena, R.B. Harvey, W.E Huff, D.E. Corder, T.D. Phillips, G.E. Rottinghaus. Efficacy of a hydrated sodium calcium aluminosilicate to reduce the toxicity of aflatoxin and T-2 toxin. Poult. Sci., 1990, 69, pp. 1078-1086.

L.F. Kubena, R.B. Harvey, W.E. Huff, M.H. Elissalde, A.G. Yersin, T.D. Phillips, G.E. Rottinghaus. Efficacy of hydrated sodium calcium aluminosilicates to reduce the toxicity of aflatoxin and diacetoxyscirpenol. Poult. Sci., 1993, 72, pp. 51-59.

R. Patterson, L.G. Young. Efficacy of hydrated sodium calcium aluminosilicates, screening and dilution in reducing the effects of mold contaminated corn in pigs. Can. J. Anim. Sci., 1993, 73, pp. 615-624.

L.F. Kubena, R.B. Harvey, R.H. Bailey, S.A. Buckley, G.E. Rottinghaus. Effects of hydrated sodium calcium aluminosilicate T-Bind™ on mycotoxicosis in young broiler chickens. Poult. Sci., 1998, 77, pp. 1502-1509.

G. Schatzmayr, W.-D. Moll, U. Hofstetter, E. Vekiru, D. Schatzmayr, Y.H. Cheng. Mycotoxin deactivating feed additives in animal nutrition. Boku-Symposium Tiererhahrung, Nov. 2, 2006, Wien, pp. 47-53.

G. Avantaggiato, R. Havenaar, A. Visconti. Evaluation of the intestinal absorption of deoxynivalenol and nivalenol by an in vitro gastrointestinal model, and the binding efficacy of activated carbon and other adsorbent materials. Food and Chemical Toxicology, 2004, 42 (5), pp. 817-824.

D.F.Tikhomirov, N.N.Nutsubidze, V.M.Lakhtin, A.A.Klyosov. Isolation of endoglucanase multiple forms with enhanced hydrophobicity from *Trichoderma reesei*. Biochemistry (Moscow), 1987, V. 52, No. 7, p. 921-930 (Russ.).

PCT WO02/052950 A1. Organomineral adsorbent of mycotoxin as an animal feed additive, procedure for production and application. 2002.

A. Daković, M. Tomašević-Čanović, G.E. Rottinghaus, S. Matijašević, Ž. Sekulić. Fumonisin B1 adsorption to octadecyldimethylbenzyl ammonium-modified clinoptilolite-rich zeolitic tuff. Microporous and Mesoporous Materials, 2007, 105 (3), pp. 285-290.

B. Harris, Jr., R. Lobo. Feeding yeast culture to lactating dairy cows. J. Dairy Sci., 1988, 71 (Suppl. 1), p. 276 (Abstract).

J. Hayat, T.F. Savage, L.W. Mirosh. The reproductive performance of two genetically distinct lines of medium white turkey hens when fed breeder diets with and without a yeast culture containing *Saccharomyces cerevisiae*. Animal Feed Science and Technology, 1993, 43 (3-4), pp. 291-301.

J. Gao, H.J. Zhang, S.H. Yu, S.G. Wu, I. Yoon, J. Quigley, Y. P. Gao, G.H. Qi. Effects of Yeast Culture in Broiler Diets on Performance and Immunomodulatory Functions. Poult. Sci., 2008, 87, pp. 1377-1384.

J.C. Reyes, M.R. Ellersieck, T.L. Veum. Effect of yeast culture in sow diets on apparent nutrient digestibility and reproductive performance. J. Anim. Sci., 1991, 69 (Suppl.l), p. 378 (Abstract).

M. Forat. Comparison of Diamond V XP and BioSaf in piglets weaned at 21 days of age. 2002, Instituto Internacional de Investigación Animal (IIIa) experimental station. Querétaro, Mexico, SW213-s.

PCT/US1994/008152. Animal feeds comprising yeast glucan. 1995.

V.R. Stanley, R. Ojo, S. Woldesenbet, D.H. Hutchinson, L.F. Kubena. The use of *Saccharomyces cerevisiae* to suppress the effects of aflatoxicosis in broiler chicks. Poult. Sci., 1993, 72, pp. 1867-1872.

P. H. Shetty, L. Jespersen. *Saccharomyces cerevisiae* and lactic acid bacteria as potential mycotoxin decontaminating agents. Trends in Food Science & Technology, 2006, 17 (2), pp. 48-55.

L. Trenholm, B. Stewart, L. Underhill, D. Prelusky. Ability of Graingard to bind zearalenone and vomitoxin in vitro. Proceedings of the 10th Annual Alltech Symposium on Biotechnology in the Feed Industry, 1994, Nicholasville, KY.

L.L. Chamley, H.L. Trenholm, D.B. Prelusky. Mycotoxins: their origin, impact and importance: insights into common methods of control and elimination. In: Biotechnology in the Feed Industry, Proceedings of Alltech's Eleventh Annual Symposium, 1995, T.P. Lyons and K.A. Jacques (Eds), pp. 41-63.

T.W. Park, C.I. Kim, V.G. Stanleyk. Effect of dietary aflatoxin and BioMos on cholesterol and basic nutrient content of broiler chicken meat. Annual Meeting of the Institute of Food Technology, New Orleans, Jun. 22-26, 1996.

B.K. Maresh, G. Devegowda. Ability of aflatoxin binders to bind aflatoxin in liquid media—an in vitor study. In: WPSA (ed.), Proc. Of XX World Poultry Congress, New Delhi, Sep. 2-5, 1996, pp. 295-296.

B.K. Maresh, G. Devegowda. Ability of aflatoxin binders to bind aflatoxin in contaminated poultry feeds—an in vitro study. In: WPSA (ed.), Proc. Of XX World Poultry Congress, New Delhi, Sep. 2-5, 1996, p. 296.

G. Devegowda, B.I.R. Aravind, M.G. Morton. *Saccharomyces cerevisiae* and mannooligo-saccharides to counteract aflatoxicosis in broilers. Proc. Austral. Poult. Sci. Symp., Sydney, Australia, 1996, 8, p. 103-106.

M.V.L.N. Raju, G. Devegowda. Influence of modified mannanoligosaccharides on broilers exposed to individual and combined mycotoxicoses of aflatoxin, ochratoxin and T-2 toxin. Abstract No. 229, PSA'99 University of Arkansas, Springdale, Aug. 8-11, 1999, p. 52.

G. Devegowda, Mettre les mycotoxines sur la touche: d'où viennent les glucomannanes esterifies. Feed. Times, 2000, 4, pp. 12-14.

A. Yiannikouris, J.-P. Jouany. Mycotoxins in feeds and their fate in animals: a review. Animal Research, 2002, 51, pp. 81-99.

E. Santin, A. Paulillo, L.S. Nakagui, A. Alessi, W.J.C. Polvero, a. Maiorka. Evaluation of Cell Wall Yeast as Adsorbent of Ochratoxin in Broiler Diets. Int. J. of Poultry Sci., 2003, 2 (6), pp. 465-468.

E. Santin, A. Paulillo, L.S. Nakagui, A. Alessi, A. Maiorka. Evaluation of Yeast Cell Wall on The Performance of Broilers Fed Diets With or Without Mycotoxins. Brazilian J. of Poultry Science, 2006, 8 (4), pp. 221-225.

S.J. Bursian, R.R. Mitchell, B. Yamini, S.D. Fitzgerald, P.A. Murphy, G. Fernadez, G.E. Rottinghaus, L. Moran, K. Leefers, I. Choi. Efficacy of a commercial mycotoxin binder in alleviating effects of ochratoxin A, fumonisin B1, moniliformin and zearalenone in adult mink. Vet. Human Toxicol., 2004, 46, pp. 122-129.

U.S. FDA, Center for Veterinary Medicine. Nationwide survey of distillers grains for aflatoxins, Nov. 21, 2006; http://www.fda.gov/cvm/AflatoxinAssign.htm.

F. Wu, G.P. Munkvold. Mycotoxins in Ethanol co-products: Modeling economic impacts on the livestock and management strategies. J. Agric. Food Chem., 2008, 56, pp. 3900-3911.

\* cited by examiner

COMPOSITIONS AND METHODS FOR DECONTAMINATION OF ANIMAL FEED CONTAINING MYCOTOXINS TYPICAL FOR BOTH NORTHERN AND SOUTHERN CLIMATES

Claims the priority date of the provisional same name application U.S. 61/141,233 of Dec. 29, 2008

FEDERALLY SPONSORED RESEARCH AND DEVELOPMENT

None used in the present application.

REFERENCES CITED [REFERENCED BY]

| U.S. Patent Documents | | |
|---|---|---|
| 4,764,596 | August 1988 | Lora et al. |
| 5,165,946 | November 1992 | Taylor et al. |
| 5,639,492 | June 1997 | Turk et al. |
| 5,935,623 | August 1999 | Alonso-Debolt |
| 6,045,834 | April, 2000 | Howes et al. |
| 6,827,959 | December 2004 | Schall et al. |

| Foreign Patent Documents | | |
|---|---|---|
| PCT/US1994/008152 | July 1994 | Hayen et al. |
| PCT WO9701629 A1 | 970116 | Nielsen J. B. and Tikhomirov D. F. |
| PCT WO02/052950 | July 2002 | Tomasevich-Canovich et al. |

OTHER REFERENCES

1. N. Magan, D. Aldred. Post-harvest control strategies: Minimizing mycotoxins in the food chain. International Journal of Food Microbiology, 2007, 119 (1-2), pp. 131-139
2. E. M. Binder, L. M. Tan, L. J. Chin, J. Handl, J. Richard. Worldwide occurrence of mycotoxins in commodities, feeds and feed ingredients. Animal Feed Science and Technology, 2007, 137 (3-4), pp. 265-282
3. G. Devegowda, M. V. L. N. Raju, N. Afzali, H. V. L. N. Swami. Mycotoxin picture worldwide: novel solutions for their counteraction. In: Biotechnology in the Feed Industry, Proceedings of the 14th Annual Symposium (T. P. Lyons and K. A. Jacques eds.), 1998, Nottingham University Press, pp. 241-255
4. P. Zöllner, B. Mayer-Helm. Trace mycotoxin analysis in complex biological and food matrices by liquid chromatography-atmospheric pressure ionisation mass spectrometry. Journal of Chromatography, 2006, 1136 (2), pp. 123-169
5. M. C. Jewett, G. Hofmann, J. Nielsen. Fungal metabolite analysis in genomics and phenomics. Current Opinion in Biotechnology, 17 (2), pp. 191-197
6. A. Huwig, S. Freimund, O. Käppeli, H. Dutler. Mycotoxin detoxication of animal feed by different adsorbents. Toxicology Letters, 2001, 122 (2), pp. 179-188
7. G Devegowda, M. V. L. N. Raju, H. V. L. N. Swami. Mycotoxins: novel solutions for their counteraction. Feedstuffs, 1998, 70 (50), pp. 12-17
8. M. Sabater-Vilar, H. Malekinejad, M. Selman, M. Doelen, J Fink-Gremmels. In vitro assessment of adsorbents aiming to prevent deoxynivalenol and zearalenone mycotoxicoses. Mycopathologia, 2007, 163 (2), pp. 81-90
9. G. M. Avantaggiato, M. Solfrizzo, A. Visconti. Recent advances on the use of adsorbent materials for detoxification of *Fusarium* mycotoxins. Food Additives and Contaminants, 2005, 22, pp. 379-388
10. L. W. Whitlow. Evaluation of mycotoxin binders. In: Zimmerman, N. G. (ed.) Proc. 4th Mid-Atlantic Nutrition Conference, 2006, University of Maryland, College Park, pp. 132-143
11. U.S. Pat. No. 5,165,946. Animal feed additive and method for inactivating mycotoxins present in animal feed, 1992.
12. Y. Mussaddeq, I. Begum, S. Akhter. Activity of Aflatoxins Adsorbents in Poultry Feed. Pakistan Journal of Biological Sciences, 2000, 3 (10), pp. 1697-1699
13. U.S. Pat. No. 5,935,623. Use of thermally treated clays in animal feeds. 1999
14. U.S. Pat. No. 5,639,492. Method and composition for achieving animal weight gain with mycotoxin-contaminated animal food. 1997
15. S. J. Bursian, R. J. Aulerich, J. K. Cameron, N. K. Ames, B. A. Steficek. Efficacy of hydrated sodium calcium aluminosilicate in reducing the toxicity of dietary zearalenone to mink. J. Appl. Toxicol., 1992, 12, pp. 85-90
16. W. E. Huff, L. F. Kubena, R. B. Harvey, T. D. Phillips. Efficacy of hydrated sodium calcium aluminosilicate to reduce the individual and combined toxicity of aflatoxin and ochratoxin A. Poult. Sci., 1992, 71, pp. 64-69
17. J. Bauer. Mouglichkeiten zur Entgiftung mykotoxinhaltiger Futtermittel. Monatsh. Veterinaurmed., 1994, 49, pp. 175-181
18. A. R. Garcia, E. Avila, R. Rosiles, V. M. Petrone. Evaluation of two mycotoxin binders to reduce toxicity of broiler diets containing Ochratoxin A and T-2 toxin contaminated grain. Avian Diseases, 2003, pp. 691-699
19. L. F. Kubena, R. B. Harvey, W. E Huff, D. E. Corrier, T. D. Phillips, G. E. Rottinghaus. Efficacy of a hydrated sodium calcium aluminosilicate to reduce the toxicity of aflatoxin and T-2 toxin. Poult. Sci., 1990, 69, pp. 1078-1086
20. L. F. Kubena, R. B. Harvey, W. E. Huff, M. H. Elissalde, A. G. Yersin, T. D. Phillips, G. E. Rottinghaus. Efficacy of hydrated sodium calcium aluminosilicates to reduce the toxicity of aflatoxin and diacetoxyscirpenol. Poult. Sci., 1993, 72, pp. 51-59
21. R. Patterson, L. G. Young. Efficacy of hydrated sodium calcium aluminosilicates, screening and dilution in reducing the effects of mold contaminated corn in pigs. Can. J. Anim. Sci., 1993, 73, pp. 615-624
22. L. F. Kubena, R. B. Harvey, R. H. Bailey, S. A. Buckley, G. E. Rottinghaus. Effects of hydrated sodium calcium aluminosilicate T-Bind™ on mycotoxicosis in young broiler chickens. Poult. Sci., 1998, 77, pp. 1502-1509
23. G. Schatzmayr, W.-D. Moll, U. Hofstetter, E. Vekiru, D. Schatzmayr, Y. H. Cheng. Mycotoxin deactivating feed additives in animal nutrition. BOKU-Symposium Tiererhahrung, 2 Nov. 2006, Wien, pp. 47-53
24. G. Avantaggiato, R. Havenaar, A. Visconti. Evaluation of the intestinal absorption of deoxynivalenol and nivalenol by an in vitro gastrointestinal model, and the binding efficacy of activated carbon and other adsorbent materials. Food and Chemical Toxicology, 2004, 42 (5), pp. 817-824
25. U.S. Pat. No. 6,827,959 B1, Mycotoxin adsorbents. 2004
26. PCT WO02/052950 A1. Organomineral adsorbent of mycotoxin as an animal feed additive, procedure for production and application. 2002
27. A. Daković, M. Tomašević-Čanović, G. E. Rottinghaus, S. Matijašević, Ž. Sekulić. Fumonisin B1 adsorption to octadecyldimethylbenzyl ammonium-modified clinoptilolite-rich zeolitic tuff. Microporous and Mesoporous Materials, 2007, 105 (3), pp. 285-290
28. B. Harris, Jr., R. Lobo. Feeding yeast culture to lactating dairy cows. J. Dairy Sci., 1988, 71 (Suppl. 1), p. 276 (Abstract)

29. J. Hayat, T. F. Savage, L. W. Mirosh. The reproductive performance of two genetically distinct lines of medium white turkey hens when fed breeder diets with and without a yeast culture containing *Saccharomyces cerevisiae*. Animal Feed Science and Technology, 1993, 43 (3-4), pp. 291-301

30. J. Gao, H. J. Zhang, S. H. Yu, S. G. Wu, I. Yoon, J. Quigley, Y. P. Gao, G. H. Qi. Effects of Yeast Culture in Broiler Diets on Performance and Immunomodulatory Functions. Poult. Sci., 2008, 87, pp. 1377-1384

31. J. C. Reyes, M. R. Ellersieck, T. L. Veum. Effect of yeast culture in sow diets on apparent nutrient digestibility and reproductive performance. J. Anim. Sci., 1991, 69 (Suppl. 1), p. 378 (Abstract)

32. M. Forat. Comparison of Diamond V XP and BioSaf in piglets weaned at 21 days of age. 2002, Instituto Internacional de Investigación Animal (IIIA) experimental station. Querétaro, Mexico, SW213-s 33. PCT/US1994/008152. Animal feeds comprising yeast glucan. 1995.

34. V. R. Stanley, R. Ojo, S. Woldesenbet, D. H. Hutchinson, L. F. Kubena. The use of *Saccharomyces cerevisiae* to suppress the effects of aflatoxicosis in broiler chicks. Poult. Sci., 1993, 72, pp. 1867-1872

35. P. H. Shetty, L. Jespersen. *Saccharomyces cerevisiae* and lactic acid bacteria as potential mycotoxin decontaminating agents. Trends in Food Science & Technology, 2006, 17 (2), pp. 48-55

36. L. Trenholm, B. Stewart, L. Underhill, D. Prelusky. Ability of Graingard to bind zearalenone and vomitoxin in vitro. Proceedings of the 10th Annual Alltech Symposium on Biotechnology in the Feed Industry, 1994, Nicholasville, Ky.

37. L. L. Charmley, H. L. Trenholm, D. B. Prelusky. Mycotoxins: their origin, impact and importance: insights into common methods of control and elimination. In: Biotechnology In the Feed Industry, Proceedings of Alltech's Eleventh Annual Symposium, 1995, T. P. Lyons and K. A. Jacques (Eds), pp. 41-63

38. T. W. Park, C. I Kim, V. G. Stanleyk. Effect of dietary aflatoxin and BioMos on cholesterol and basic nutrient content of broiler chicken meat. Annual Meeting of the Institute of Food Technology, New Orleans, 22-26 Jun. 1996

39. B. K. Maresh, G. Devegowda. Ability of aflatoxin binders to bind aflatoxin in liquid media—an in vitor study. In: WPSA (ed.), Proc. Of XX World Poultry Congress, New Delhi, 2-5 Sep. 1996, pp. 295-296

40. B. K. Maresh, G. Devegowda. Ability of aflatoxin binders to bind aflatoxin in contaminated poultry feeds—an in vitro study. In: WPSA (ed.), Proc. Of XX World Poultry Congress, New Delhi, 2-5 Sep. 1996, p. 296

41. G. Dewegowda, B. I. R. Aravind, M. G. Morton. *Saccharomyces cerevisiae* and mannooligo-saccharides to counteract aflatoxicosis in broilers. Proc. Austral. Poult. Sci. Symp., Sydney, Australia, 1996, 8, p. 103-106

42. U.S. Pat. No. 6,045,834. Compositions and methods for removal of mycotoxins from animal feed. 2000

43. M. V. L. N. Raju, G. Devegowda. Influence of modified mannanoligo-saccharides on broilers exposed to individual and combined mycotoxicoses of aflatoxin, ochratoxin and T-2 toxin. Abstract No. 229, PSA'99 University of Arkansas, Springdale, Aug. 8-11, 1999, p. 52

44. G. Devegowda, Mettre les mycotoxines sur la touche: d'où viennent les glucomannanes esterifies. Feed. Times, 2000, 4, pp. 12-14

45. A. Yiannikouris, J.-P. Jouany. Mycotoxins in feeds and their fate in animals: a review. Animal Research, 2002, 51, pp. 81-99

46. E. Santin, A. Paulillo, L. S. Nakagui, A. Alessi, W. J. C. Polvero, A. Maiorka. Evaluation of Cell Wall Yeast as Adsorbent of Ochratoxin in Broiler Diets. Int. J. of Poultry Sci., 2003, 2 (6), pp. 465-468

47. E. Santin, A. Paulillo, L. S. Nakagui, A. Alessi, A. Maiorka. Evaluation of Yeast Cell Wall on The Performance of Broilers Fed Diets With or Without Mycotoxins. Brazilian J. of Poultry Science, 2006, 8 (4), pp. 221-225

48. S. J. Bursian, R. R. Mitchell, B. Yamini, S. D. Fitzgerald, P. A. Murphy, G. Fernadez, G. E. Rottinghaus, L. Moran, K. Leefers, I. Choi. Efficacy of a commercial mycotoxin binder in alleviating effects of ochratoxin A, fumonisin B1, moniliformin and zearalenone in adult mink. Vet. Human Toxicol., 2004, 46, pp. 122-129

49. U.S. Food and Drug Administration, Center for Veterinary Medicine. Nationwide survey of distillers grains for aflatoxins, Nov. 21, 2006; http://www.fda.gov/cvm/AflatoxinAssign.htm 50. F. Wu, G. P. Munkvold. Mycotoxins in Ethanol co-products: Modeling economic impacts on the livestock and management strategies. J. Agric. Food Chem., 2008, 56, pp. 3900-3911

51. M. B. Genter, W. M. Hagler, J. A. Hansen, B. A. Mowrey, F. T. Jones, M. H. Poore, and L. W. Whitlow. Effects of mycotoxins on the health and productivity of dairy cattle. North Carolina State University. http://www.ces.ncsu.edu/gaston/Agriculture/mycotoxins/mycodairy.html 52. A. D. Garcia. Mycotoxins in corn distillers grains: a concern in ruminants. Published: Brookings, S. D., South Dakota State University, Cooperative Extension Service, 2008. http://agbiopubs.sdstate.edu.proxy2.lib.uwo.ca:2048/articles/ExEx4038.pdf 53. D. F. Tikhomirov, N. N. Nutsubidze, V. M. Lakhtin, A. A. Klyosov. Isolation of endoglucanase multiple forms with enhanced hydrophobicity from *Trichoderma reesei*. Biochemistry (Moscow), 1987, V. 52, No. 7, p. 921-930 (Russ.).

54. Cellulases with reduced mobility by immobilization or gel incorporation for use in laundry detergents or fabric softeners. Nielsen, Jack Bech; Tikhomirov, Dmitry Feodorovich, Novo Nordisk A/S, PCT Int. Appl., 77 pp. WO 9701629 A1 970116

55. A. V. Gusakov, A. P. Sinitsyn, A. G. Berlin, N. N. Popova, A. V. Markov, O. N. Okunev, D. F. Tikhomirov, and M. A. Emalfarb. Interaction between Indigo and Adsorbed Protein as a Major Factor Causing Backstaining During Cellulase Treatment of Cotton Fabrics. Applied Biochemistry and Biotechnology, 1998, 75, pp. 279-293.

56. U.S. Pat. No. 4,764,596. Recovery of lignin. 1988.

DESCRIPTION

Field of the Invention

The present invention addresses the problem of mycotoxin decontamination in animal feed by binding mycotoxins via a feed additive containing a plant biomass organic component with addition of conventional non-proprietary mycotoxin binding agents known in the art. As a result, the mycotoxins are safely excreted from the digestive tract of the agricultural and companion animals without detrimental effects on animal performance and wellbeing. Unlike the Southern climate mycotoxins (aflatoxins, fumonisins, zearalenone), which are already well-bound by yeast wall and mineral-based adsorbents, the Northern climate mycotoxins (ochratoxins, T-2 toxin, deoxynivalenol, nivalenol) have been proven problematic to bind by methods other than the described in the present invention.

BACKGROUND OF THE INVENTION

The mycotoxin contamination of feed results in billions of dollars of economic losses to animal husbandry world-wide and in some cases in health damage to human consumers due to transfer of contamination via dairy products, eggs and meats. The key mycotoxigenic moulds in partially dried grain are *Penicillium verrucosum*, producing ochratoxin (OTA) and *Fusarium graminearum* and *F. sporotrichioides*, producing deoxynivalenol (DON), nivalenol (NIV) and T-2 toxin in the damp cool climates of Northern Europe. In the South *Aspergillus flavus* is producing aflatoxins (AF), *A. ochraceus*—OTA and some *Fusarium* species are producing fumonisins (FUM) and trichothecenes DON and NIV (1, 2, 3).

Easy screening for mycotoxin contamination can be provided by a specialized Lab equipped with LC/MS, preferably with atmospheric pressure ionization (4). Up to 30 different toxins can be assayed in a single 30-min run (5).

Due to the diversity of mycotoxin chemical structures and properties, the mycotoxin binder solutions vary widely (6; 7; 8; 9; 10).

Mineral adsorbents were developed in the 1990-es, based on a number of silicates and alumo-silicates, such as phyllosilicate (11). They have been shown effective in suppressing the effect of 50 PPB Aflatoxin in broiler diets in terms of improving weight gain, FCR and mortality (12, 13). Efficiency of mineral adsorbents against Fumonisin and Zearalenone can vary from high (14) to limited. The efficiency is also limited against OTA (15; 16; 17; 18, 13). Against T-2 the efficiency is partial (18) and against trichlorocenes—such as DON and NIV—it is close to zero (19; 20; 21; 22; 23). On GI tract in-vitro model for healthy pigs a number of commercial mineral adsorbents were incapable of binding DON and NIV, while activated carbon provided substantial removal (24), however the later is known to render vitamins in feed less available as well.

Adsorption of non-aflatoxin mycotoxins can be significantly improved by coating mineral adsorbents with quaternary long-chain alkyl-aryl amines (25, 26, 27), a technique borrowed from HPLC, but such cationic surfactants are typically not allowed in animal feed.

Yeast culture addition has been known to improve health in dairy cows (28), poultry (29, 30) and pigs (31, 32), all species also addressed in a patent (33). *Saccharomyces cerevisiae* live yeast was shown to reduce the detrimental effects of aflatoxin in broiler diets (34).

However, due to multiplicity of mycotoxin structures and chemistry, the performance of yeast cells and cell wall mycotoxin binders has been demonstrated to not be universal (35). Zearalenone was shown to bind to the mannooligosaccharide fraction of the yeast cell wall at 75-80% at pH 3 and pH 4 at a ratio of 0.1 mg of toxin per gram of adsorbent (36; 37). Dietary MOS induced a significant reduction in liver cholesterol and liver fat levels on aflatoxin-stressed chickens (38). MOS also showed high binding capacity (76-87%, depending on toxin/binder ratio) for free Aflatoxin without feed (39), and for the toxin incorporated into poultry feed, the effective binder inclusion rate was demonstrated to be as low as 0.5 kg/ton (40). The binding of Aflatoxin to mannooligosaccharides was shown to be pH-dependent, pH 6.5 allowing more toxin binding (up to 80% versus 67%) compared to pH 4.5 (41).

U.S. Pat. No. 6,045,834, protecting the Mycosorb technology (42), claims that yeast cell wall and mineral clay are acting in synergy, providing better mycotoxin binding than yeast cell wall debris alone. In addition, the patent indicates that when the cell wall isolated from yeast is subjected to an alcohol shock (i.e. originating from anaerobic ethanol fermentations), it has a better binding capacity for mycotoxins (due to thickening and increase in surface area of the cell wall) than yeast cell wall material from an aerobic yeast fermentation. The patent demonstrates through in-vitro experiments that Aflatoxin, Zearalenone and Fumonisin were well bound by Mycosorb-type adsorbent from aqueous mixes with feed, but DON, OTA and T2 remained still in solution at 67-87% level of total content.

Another group was reporting similar results in vitro on toxin-contaminated broiler feed: modified manno-oligosaccharides (1 kg/ton) were binding 86% of aflatoxin B1 (@300 ppb), but only 28% of T-2 (@3000 ppb) and only 25% OTA (@2000 ppb), regardless of pH (43). Subsequent testing of yeast glucomannan demonstrated binding of 95% of total aflatoxins, 67% of FUM, 77% of ZEN, but only 33% of T-2, 13% of DON, 12% of OTA and 8% of NIV (44, 45).

On a GI tract in-vitro model for healthy pigs, yeast-based adsorbents, such as Mycosorb and its analogs, were incapable of binding trichothecenes DON and NIV, while treatment with activated carbon resulted in their substantial removal (24).

Yeast cell wall feed additives did not improve the feed intake, weight gain and feed conversion of 42-day broilers fed diets contaminated with 500 ppb OTA versus the birds on mycotoxin-free control diets (46, 47).

A glucan polymer product did not alleviate the toxic effects on mink consuming diets contaminated with fumonisin, ochratoxin, moniliformin, and zearalenone (48).

As a recent development, the DDGS from fuel ethanol industry may become an unexpected competitor to yeast cell wall-based mycotoxin binders, making them redundant. DDGS contains a significant amount of yeast cells, sufficient for binding aflatoxins and fumonisin, even taking into account their 3-fold concentration from maize grain to pot solids (49). The difficult to bind types of mycotoxins are also concentrated 3-fold, but cannot be alleviated by yeast-based DDGS components or specially added binders. Meanwhile, the negative effect of feeding DDGS with current mycotoxin levels to pigs only was calculated nationally at $2-8 million p.a. at current penetration of DDGS into swine feed and $30-290 million at inclusion of DDGS into all swine feed at 200 kg/ton (50).

The major part of distiller's grain is consumed by cattle. According to field observations, when DON concentrations were higher than 0.5 ppm, milk yield was reduced by 25 pounds (51). A maximum of 7.7 ppm and an average of 3.6 ppm of DON were reported for 54 samples of DDGS tested (accumulated crop years: May 1, 2000 through Apr. 30, 2007). The respective numbers for wet distiller's grain were 4.3 and 1.9 ppm (52). These numbers indicate that feeding DDGS and WDG to ruminants without control of DON already leads to substantial economic losses. Again, these losses cannot be alleviated using yeast cell wall-based mycotoxin binders.

The present invention is proposing to take advantage of the increased hydrophobicity of a number of ambivalent proteins in order to modify the surface of lignocellulosic material with a hydrophobizing layer. Without such modification, the adsorben surface remains rather hydrophilic and characterized by low affinity and adsorption capacity towards hydrophobic mycotoxins. For example, endoglucanases of the cellulase complex of an industrial producer *Trichoderma reesei* were shown to possess abnormally high hydrophobicity and did not bind to ion exchange resins, but were retarded on a column for hydrophobic chromatography (53).

Microbial cellulases appear to be most suitable for the role of a protein modifying the lignocellulose surface towards increased hydrophobicity since they contain a special cellulose binding domain. This feature allowed the creation of cellulase enzyme products with targeted surface action and decreased damage of cotton fabrics by immobilizing the cellulase enzyme on cellulose particles (54).

The ambivalent nature of microbial cellulases plays a negative role during enzymatic stonewashing of jeans, an industry consuming a considerable part of commercially produced cellulase enzymes. When the enzyme molecule has a cellulose binding domain, the enzyme is strongly adsorbed on cotton, while the hydrophobic globule of the active site attracts particles of the washed off dye (55). The phenomenon is called backstaining, where the dye washed off from the denim is redeposited on the white fabric of pockets and denim areas of stone abrasion, both supposed ideally to be as white as possible. Despite a significant number of studies, use of microbial cellulases for hydrophobization of lignocellulose surfaces to create inexpensive and effective adsorbents has not been mentioned in the literature, nor in patents, and is a novelty proposed in the present invention. No other proteins are described in literature as surface modifiers of lignocellulose for these purposes.

SUMMARY OF THE INVENTION

A primary objective of the present invention is to provide a method for the adsorption of mycotoxins in common animal feedstuffs. The method utilizes a combination of a modified plant ligno-polysaccharide and conventional non-proprietary mycotoxin adsorbing component known in the art.

Yet another object of the present invention is to provide a composition comprising a combination as described above which may render harmless a wider range of multiple mycotoxins, with specific emphasis on mycotoxins typical for Northern climates (OTA, T-2, DON, NIV), currently poorly handled by the existing mycotoxin adsorbents, in addition to mycotoxins typical for Southern climates (AF, FUM, ZEN), that are handled tolerably by the current generation of mycotoxin binders.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objectives, and in accordance with the purposes of the present invention as described herein, a novel method is described for binding mycotoxins present in animal feeds. In particular, in a preferred embodiment, the invention provides a method and a composition for binding mycotoxins present in animal feed rations encompassing a modified plant ligno-polysaccharide and a conventional non-proprietary mycotoxin adsorbing component, or multiple components, known in the art. The modified plant component can be produced by a number of methods that remove protein and starch moiety, increase the ligno-cellulose and hemicellulose content and generate additional surface area by milling (micronization). The non-proprietary mycotoxin binding components, selected from the class of natural clays, artificial clays, organic polymers, activated charcoal, yeast cell wall polysaccharides, etc., are readily available commercially.

To facilitate the capacity and affinity of the newly developed mycotoxin binding agent, the surface area of the ligno-cellulosic component is further modified (hydrophobized) by creating an adsorbed layer of a ambivalent protein, having affinity towards cellulose, from one side, and towards mycotoxins, from the other side. In particular, cellulase enzymes from the cellulase complex of fungal microorganism *Trichoderma reesei* can be used, because they contain a cellulose binding domain and an active site domain, the later characterized with increased hydrophobicity.

The compositions provided by the invention can be fed to any agricultural, companion and wild animal including, but not limited to, avian, bovine, porcine, equine, ovine, caprine, canine, and feline species. When admixed with feed or fed as a supplement, the compositions with their surprisingly increased mycotoxin-binding capacity and expanded mycotoxin type range, decrease intestinal absorption of the mycotoxins by the affected animal, thereby improving performance and health, and reducing the incidence of mycotoxin-associated diseases.

DETAILED DESCRIPTION OF THE INVENTION

The present invention is based upon the surprising discovery that a modified plant material can have an unexpected binding effect on mycotoxins of Northern origin in animal feeds, which are known to be difficult to sequester otherwise. Thus, the invention provides a method and a composition for binding mycotoxins present in animal feeds utilizing a combination of modified plant ligno-cellulosic material and a non-proprietary mycotoxin binding agent known in the art.

The ligno-cellulosic material can be derived from grain, legume and pant biomass by-products, such as, but not limited to: brans, hulls, middlings, distiller's grains, brewer's spent grains, sunflower cake, sugar beet pulp, sugar cane bagasse, solids after cellulosic and ligno-cellulosic biomass fermentation into alcohols, ligno-cellulosic residue after acid or enzymatic hydrolysis of lignocellulose and other plant biomass, by-products of pulp & paper industry, saw dust, wood chips, peat, etc.

These by-products are known to be chemically and morphologically related to the regular feed components and are not alien to the gastro-intestinal tract of agricultural and companion animals. They would be better tolerated by animals compared to mineral, man-made or microbiological agents currently used as mycotoxin binders.

In another embodiment of the invention, the mycotoxin binding capacity of the modified plant biomass is pre-programmed and enhanced in the initial plant material using the classical plant hybridization/selection programs and plant genetic engineering tools known in the art. The direction of introducing novel treats into plants is generally opposing to the course taken in the cellulosic ethanol program. While in the cellulosic ethanol program the plant biomass is transformed to decrease the lignin content and the degree of cellulose crystallinity, the treats benefiting the mycotoxin adsorption include increase in lignin content, anion-exchange groups (such as amino-groups) and a crystalline cellulosic backbone strength.

The plant material selected is subjected to a number of mechanical and chemical treatment steps, aimed at increasing the hemicellulose content, specific area of the resulting adsorbent and the hydrophobicity of the surface.

One of the treatments of the plant material, according to the present invention, is aimed at increasing the mycotoxin binding capability by using preliminary mechanical pulverizing (micronization) yielding a low and uniform particle size. This insures a better susceptibility of the resulting raw material to hydrolase enzymes, applied in the following sequence: amylase (for starch removal), protease (for protein removal), beta-glucanase/cellulase (for surface modification).

In another implementation of this invention, the material is subjected to wet milling after enzymatic hydrolysis and the extraction of generated solubles. The milling is performed at low suspension solids content (3-5%) and then at high solids content (20-30%).

In yet another embodiment of this invention, the lignocellulosic pore and high specific surface structure is prevented from collapsing on itself and on other components of feed. This alleviates the risk especially pronounced during palletizing and extrusion. The prevention of collapse is achieved through the protection of the surface and the pore structure of the fabricated adsorbent by creating an artificial non-melting layer on the surface and inside the pores using methods known in the art, such as depositing an artificial layer of mineral sediment generated by impregnation of the adsorbent with one soluble compound and then acting upon it with another soluble compound, with both compounds forming upon mixing an insoluble compound in place.

In yet another embodiment of this invention, the lignocellulosic pore and high specific surface structure is prevented from collapsing on itself and on other components of feed, by forming a mixed adsorbent structure with yeast cell wall, maintained in place by electrostatic interactions between the positively charged chitin of the cell wall and negatively charged hemicellulose and lignin of the plant material. This is achieved by mixing the plant material with the yeast cell wall in a wet state and drying the resulting mixture either by freeze-drying or by spray-drying/milling. As an additional benefit, the micro-fibrils of ligno-cellulose stabilize the particle structure of yeast cell wall. The ligno-cellulose component helps to maintain the high dispersion and low density of the yeast cell wall component. The resulting composition can be mixed very well into the animal feed.

In yet another embodiment of the present invention the surface of lignocellulosic component is modified by adsorbing an ambivalent protein, having affinity to the lignocellulose surface, on one hand, and to mycotoxins, on the other. For example, endoglucanases of the microbial cellulase complex, microbial beta-glucanases and other hemicellulases, amylases, proteases and oxido-reductases of micromycetes, actinomycetes and bacteria can be used as ambivalent proteins. An important requirement for the ambivalent protein is to have a cellulose- or lignin-binding domain in its structure.

As the final stage of the treatment, the plant material is dried using a belt drier with subsequent dry milling or using a spray drier.

In the preferred embodiment of the present invention, the resulting plant mycotoxin adsorbing component becomes the core ingredient, enabling the successful expansion of the bound mycotoxins, including those difficult to adsorb mycotoxins typical for Northern climates (OTA, T-2, DON, NIV). Other ingredients, providing affinity towards more easily bound mycotoxins typical for Southern climates (AF, FUM, ZEN) can be included at a rate of 10-90% (w/w), chosen from conventional non-proprietary binding agents known in the art and used in the industry, such as, but not limited to: natural clays, man-made clays, organic polymers and yeast cell wall components.

In a preferred embodiment, the composition of the present invention comprises between about 10% and about 90% of modified plant ligno-cellulose component, and between about 90% and about 10% of a conventional non-proprietary mycotoxin binding agent. A preferred composition of the invention comprises from between about 25% to about 50% of modified plant ligno-cellulose component, and between about 75% and about 50% of a conventional non-proprietary mycotoxin binding agent. An especially preferred embodiment of the invention comprises from between about 30% to about 40% of modified plant ligno-cellulose component, and between about 70% and about 60% of a conventional non-proprietary mycotoxin binding agent. The preferred physical form of the invention is a dry, free-flowing powder suitable for direct inclusion into animal feeds or as a supplement to a total mixed ration.

The compositions provided by the present invention can be added to any commercially available feedstuffs for livestock or companion animals including, but not limited to, premixes, concentrates and pelleted concentrates. The composition provided by the present invention may be incorporated directly into commercially available mashed and pelleted feeds or fed supplementally to commercially available feeds. When incorporated directly into animal feeds, the present invention may be added to such feeds in amounts ranging from 0.2 to about 5 kilograms per ton of feed. In a preferred composition, the invention is added to feeds in amounts ranging from 0.5 to about 2 kilograms per ton of feed. In an especially preferred composition, the invention is added to feeds in amounts ranging from 1 to 2 kilograms per ton of feed. The composition contained in the present invention may be fed to any animal, including but not limited to, avian, bovine, porcine, equine, ovine, caprine, canine, and feline species.

The methods of the invention comprise increasing binding and removal of mycotoxins from animal feedstuffs, including, but not limited to, aflatoxins, zearalenone, vomitoxin, fumonisins, T2 toxin and ochratoxin, thereby increasing safety and nutritional value of the feed and the overall health and performance of the animal. The compositions of the invention are sufficiently effective in increasing binding of OTA, T-2, DON, NIV, compared to binding obtained with current generation of mycotoxin binders, in addition to binding aflatoxins, zearalenone, and fumonisin, where the current mycotoxin binders already excel.

The proposed methods of binding of an extended range of mycotoxins are especially useful for alleviating the effect of mycotoxin concentration while fermenting grains during ethanol and beer fermentations. The resulting wet distiller's grain and dried distiller's grain, including DDGS, has on average a 3-fold increase in mycotoxin content compared to initial materials. While aflatoxins can be bound by yeast present in spent grains and by conventional adsorbents based on yeast cell wall, DON and T-2 are discovered in WDG and DDGS on a regular basis and at elevated levels and could only be controlled by a solution proposed in the present invention.

The composition contained in the present invention may be added to mycotoxin-contaminated animal feedstuffs in amounts from about 0.02% to 0.5% by weight of feed. In a preferred embodiment, the composition is added to mycotoxin-contaminated animal feedstuffs in amounts from about 0.03% to 0.3% by weight of feed. In an especially preferred embodiment, the invention is added to mycotoxin-contaminated animal feedstuffs in amounts from about 0.1% to 0.2% by weight of feed.

Alternatively, the composition contained in the present invention may be directly fed to animals as a supplement in amounts ranging from 2.0 to 20 grams per animal per day. An especially preferred embodiment comprises feeding the composition contained in the present invention to animals in amounts ranging from 5 to 15 grams per animal per day, depending on the animal species, size of the animal and the type of feedstuff to which the composition is to be added.

EXAMPLES

The following examples are intended to be illustrative of the invention, and are not to be considered restrictive of the scope of the invention as otherwise described herein.

Example 1

Wheat bran was sieved through a screen to remove artificial inclusions, dust, etc. A fraction passing through 3 mm mesh and retarded by 0.5 mm mesh was used for further processing.

The selected fraction of wheat bran was pulverized on a hammer mill with an exit sieve with 0.5 mm openings and suspended in water at 25% w/w. The suspension was treated by liquid alpha-amylase enzyme (Spezyme Ethel by Danisco-Genencor or similar). Conditions of enzyme treatment: 70° C., pH 6.0-6.2, CaCl2-0.2 g/l, enzyme dosage—1 kg/ton of starch content, duration—6 hours.

After the treatment the pH was reduced to 4.5 by addition of HCl (diluted 1:1 with water) and the suspension was treated with a liquid glucoamylase enzyme (Distilase L-400 from Danisco-Genencor or similar). Treatment conditions were: 55° C., pH 4.5, 60 min, enzyme dosage 2.5 kg/ton of initial starch content.

As a next step, the suspension was treated by liquid bacterial protease (Protex 6L by Danisco-Genencor or similar). Treatment conditions were: pH 4.5, 55° C., enzyme dosage 0.5 kg/ton of initial protein content in the wheat bran, duration—60 min.

After that the suspension was treated with a liquid beta-glucanase/cellulase enzyme (Spezyme by Danisco-Genencor or similar). Treatment conditions were: pH 4.5, 50° C., enzyme dosage—20 kg/ton of initial dry weight, duration—6o0 min. The resulting suspension was rinsed with water using a decanter centrifuge to remove simple sugars and low molecular weight peptides and amino-acids, to be used in a separate process for other purposes.

The remaining solids at 14-15% concentration were wet-milled on a disk mill. The resulting paste was concentrated to 25-30% solids by filtration on a vacuum drum filter and sent for wet milling once again. The resulting solids were characterized by the water retention, measured at 150% after the first milling and at 200% after the second milling, the specific surface area measured by Nitrogen adsoption ending up at 400 sq·m/gram.

The product was further dried by spray drying on a vertical installation with feed rate of 200 l/min, feed pressure 200 bar, inlet temperature 150° C. and exit temperature of 60*65° C. The final moisture content of the powder was measured at 8%.

The resulting powder has a particle size of 50 mkm and less. ELISA method was used for mycotoxin assay. The chemical composition and the mycotoxin binding properties are presented in Tables 1 and 2.

TABLE 1

| Mycotoxin adsorbing component origin | Composition, % | | | T-2 mycotoxin adsorption, % pH 2 | T-2 desorption, % pH 8 | Residual adsorption, % pH 2 |
| --- | --- | --- | --- | --- | --- | --- |
| | Acid fiber | Crude protein | Starch | | | |
| Grain hulls | 95.0 | 1.10 | 0.20 | 60.2 | 7.5 | 52.7 |
| Distiller's grain, wheat-based | 96.0 | 0.90 | 0.15 | 62.0 | 6.5 | 55.5 |
| Distiller's grain, rye-based | 95.6 | 0.70 | 0.25 | 61.0 | 6.9 | 54.1 |
| Brewer's spent grain | 97.0 | 0.95 | 0.21 | 62.5 | 7.0 | 55.5 |

TABLE 2

| Mycotoxin adsorbing component | Ochratoxin adsorption, % pH 2 | Ochratoxin adsorption, % pH 7 | Ochratoxin desorption, % pH 8 | Residual adsorption, % pH 2 |
| --- | --- | --- | --- | --- |
| Grain hulls | 64.4 | 58.7 | 4.1 | 60.3 |

Example 2

Distiller's grain from wheat fermentation was pulverized on a hammer mill with an exit sieve with 0.5 mm openings and suspended in water at 25% w/w. The pH was reduced to 4.5 by addition of HCl (diluted 1:1 with water).

As a next step, the suspension was treated by liquid bacterial protease (Protex 6L by Danisco-Genencor or similar). Treatment conditions were: pH 4.5, 55° C., enzyme dosage 0.7 kg/ton of initial protein content in the wheat bran, duration—60 min.

After that the suspension was treated with a liquid beta-glucanase/cellulase enzyme (Spezyme by Danisco-Genencor or similar). Treatment conditions were: pH 4.5, 50° C., enzyme dosage—25 kg/ton of initial dry weight, duration—60 min.

The resulting suspension was rinsed with water using a decanter centrifuge to remove simple sugars and low molecular weight peptides and amino-acids, to be used in a separate process for other purposes.

The remaining solids at 14-15% concentration were wet-milled on a disk mill. The resulting paste was concentrated to 25-30% solids by filtration on a vacuum drum filter and sent for wet milling once again. The resulting solids were characterized by the water retention, measured at 150% after the first milling and at 200% after the second milling, the specific surface area measured by Nitrogen adsoption ending up at 400 sq·m/gram.

The product was further dried by spray drying on a vertical installation with feed rate of 200 l/min, feed pressure 200 bar, inlet temperature 150° C. and exit temperature of 60*65° C. The final moisture content of the powder was measured at 8%.

The resulting powder has a particle size of 50 mkm and less. The chemical composition and the mycotoxin binding properties are presented in Table 1.

Example 3

Distiller's grain from rye fermentation was processed as already described in Example 2 for distiller's grain from wheat fermentation. The chemical composition and mycotoxin binding properties are presented in Table 1.

Example 4

Dry brewer's grain was processed as described in Example 2 for distiller's grain. The chemical composition and mycotoxin binding properties are presented in Table 1.

Example 5

Dried sugar cane bagasse was used as a source material for extraction of lignin using a modified organosolv method, as described in U.S. Pat. No. 4,764,596, "Recovery of Lignin". The method produces precipitated lignin that can be dried to form a powder with a "fine uniform size suitable for use without further significant processing."

120 g of dry sugar cane bagasse was added to 500 ml of 60% aqueous ethanol and stirred to allow to swell. Sodium hydroxide pellets were added in small increments while stirring and measuring the pH level until the pH reached 12. The suspension was pressurized and heated to 130° C. using dry heat for 1 hour. The suspension was allowed to cool to ambient temperature (approximately 25° C.) and the solids are separated from the liquid by filtration on a paper filter. The cellulose residue solids were dried and tested on T-2 binding capacity.

The liquid extract containing solubilized lignin was processed further for lignin precipitation. Hydrochloric acid (diluted with water 1:1) was added to the extract while stirring until the pH level reached 2. The formed precipitate was removed by filtration and air-dried. The resulting lignin was dry-milled. Mycotoxin binding capacity of the two isolated bagasse components is presented in Table 3.

TABLE 3

| Mycotoxin binding component | T-2 adsorption @ pH 2.0, % | T-2 desorption, % | True adsorption, % |
| --- | --- | --- | --- |
| Lignin from sugarcane bagasse | 74 | 6 | 68 |
| Cellulose from sugarcane bagasse | 66 | 12 | 54 |

Example 6

Modified plant ligno-cellulosic component was produced from wheat bran as described in Example 1. Three batches of dry yeast cell wall were obtained from three commercial manufacturers. The samples of yeast cell wall were blended 50:50 (w/w) with the ligno-cellulosic component to produce three mycotoxin adsorbing combinations. The chemical composition and the mycotoxin binding properties of the three combinations are presented in Table 4.

TABLE 4

| Combination | Chemical Composition, % | | T-2 mycotoxin adsorption, % | | T-2 mycotoxin desorption, % | T-2 mycotoxin residual adsorption, % |
|---|---|---|---|---|---|---|
| | Crude Protein | Protein as Kjeldahl N | pH 7 | pH 2 | pH 7 | |
| Modified plant biomass + yeast cell wall No. 1 (50:50) | 8.39 | 7.11 | 52.9 | 64.0 | 7.8 | 56.2 |
| Modified plant biomass + yeast cell wall No. 2 (50:50) | 11.18 | 8.61 | 50.0 | 50.0 | 12.0 | 38.0 |
| Modified plant biomass + yeast cell wall No. 3 (50:50) | 3.57 | 2.25 | 56.0 | 56.0 | 8.9 | 47.1 |

The invention claimed is:

1. A composition for use in animal feed to bind and inactivate mycotoxins comprising plant based ligno-cellulosic residue enhanced by micronization to increase the surface area; by creating an adsorbed layer of an ambivalent protein with dual affinity towards cellulose on one side and mycotoxin on the other side; by chemical modification with an acid or enzyme treatment.

2. The composition for binding mycotoxins according to claim 1 with components selected from the group consisting of: hulls, sugar beet pulp, bagasse, corn fiber, distiller's grain, brewer's spent grain, sun flower cake, solids after coffee extraction, wood chips, saw dust, lignin, cellulosic short fibers, peat, and sapropel.

3. The composition for binding mycotoxins according to claims 1 or 2 by inactivating wide spectrum of mycotoxins, including those difficult to bind selected from the group consisting of ochratoxin, deoxynivalenol and T-2.

4. The composition for binding mycotoxins according to claims 1 or 2 comprising from about 0.02% to about 0.5% by weight of the animal's daily feed ration.

5. The animal daily feed composition according to claim 1 for decreasing intestinal absorption of mycotoxins, improving animal performance and health and reducing the incidence of mycotoxin-associated diseases.

* * * * *